United States Patent
Wu

(10) Patent No.: US 8,422,966 B2
(45) Date of Patent: Apr. 16, 2013

(54) TRANSMISSION POWER CALIBRATING METHOD AND SYSTEM APPLIED TO WIRELESS APPARATUS

(75) Inventor: Chien-Sheng Wu, Taipei Hsien (TW)

(73) Assignee: Wistron Corporation, New Taipei (TW)

( * ) Notice: Subject to any disclaimer, the term of this patent is extended or adjusted under 35 U.S.C. 154(b) by 87 days.

(21) Appl. No.: 13/184,336

(22) Filed: Jul. 15, 2011

(65) Prior Publication Data

US 2012/0155523 A1 Jun. 21, 2012

(30) Foreign Application Priority Data

Dec. 21, 2010 (TW) .............................. 99145078 A

(51) Int. Cl.
*H04B 17/00* (2006.01)
(52) U.S. Cl.
USPC .................. 455/115.1; 455/456.1; 455/423; 455/422.1; 455/12.1; 455/13.1
(58) Field of Classification Search ............... 455/115.1, 455/456.1, 423, 422.1, 12.1, 13.1
See application file for complete search history.

(56) References Cited

U.S. PATENT DOCUMENTS 7,522,918 B2 * 4/2009 Wachter et al. ............... 455/423
2009/0318103 A1 * 12/2009 Feenaghty et al. .......... 455/226.3

* cited by examiner

*Primary Examiner* — Sanh Phu
(74) *Attorney, Agent, or Firm* — McClure, Qualey & Rodack, LLP

(57) ABSTRACT

A transmission power calibrating method and a system are provided for a wireless apparatus. The wireless apparatus are controlled by a computer host to be tested at several channels and gains, and a simplified transmission power calibration table is established accordingly. The simplified transmission power calibration table is compared with each of complete transmission power calibration tables in a database. A match is detected between a first complete transmission power calibration table and the simplified transmission power calibration table. When the match is detected, a mapping table is obtained from the first complete transmission power calibration table and stored in a memory of the wireless apparatus. When the match is not detected, the wireless apparatus is controlled by the computer host to establish a second complete transmission power calibration table from which the mapping table is obtained and the mapping table is stored in the memory of the wireless apparatus.

13 Claims, 5 Drawing Sheets

| CH / Gd | 50 | 128 | 206 | 283 | 361 | 439 | 517 | 594 | 672 | 750 |
|---|---|---|---|---|---|---|---|---|---|---|
| 994 | 22.18 | 23.46 | 23.66 | 22.61 | 21.74 | 20.86 | 20.79 | 21.04 | 21.50 | 21.44 |
| 930 | 13.11 | 14.40 | 14.69 | 13.51 | 12.39 | 11.39 | 11.46 | 11.45 | 12.27 | 12.29 |
| 898 | 8.87 | 10.13 | 10.05 | 9.21 | 7.70 | 6.95 | 6.96 | 7.33 | 7.78 | 7.90 |
| 880 | 5.86 | 7.31 | 7.36 | 6.40 | 5.11 | 4.37 | 3.98 | 4.49 | 4.96 | 4.98 |
| 866 | 4.02 | 5.51 | 5.51 | 4.38 | 3.61 | 2.69 | 2.29 | 2.76 | 3.10 | 3.03 |
| 860 | 3.13 | 4.38 | 4.45 | 3.54 | 2.61 | 1.73 | 1.55 | 1.39 | 2.21 | 2.16 |
| 855 | 2.24 | 3.60 | 3.64 | 2.78 | 1.49 | 0.58 | 0.54 | 0.56 | 1.50 | 1.37 |
| 850 | 1.29 | 2.79 | 2.51 | 1.83 | 0.51 | -0.25 | -0.54 | -0.27 | 0.52 | 0.52 |
| 833 | 0.78 | 2.16 | 2.14 | 1.10 | 0.03 | -0.89 | -0.83 | -0.59 | -0.09 | -0.34 |
| 817 | 0.87 | 2.03 | 1.89 | 1.08 | 0.05 | -0.92 | -0.93 | -0.80 | -0.29 | -0.06 |
| 799 | 0.32 | 1.71 | 1.84 | 0.95 | -0.03 | -1.05 | -1.19 | -1.03 | -0.40 | -0.46 |
| 764 | -0.12 | 1.38 | 1.43 | 0.41 | -0.60 | -1.68 | -1.57 | -1.34 | -0.64 | -0.66 |
| 712 | -1.01 | 0.23 | 0.33 | -0.40 | -1.40 | -2.28 | -2.40 | -2.49 | -1.64 | -1.49 |
| 674 | -1.98 | -0.85 | -0.77 | -1.60 | -2.26 | -3.18 | -2.96 | -2.82 | -2.36 | -2.53 |
| 642 | -3.06 | -2.02 | -1.85 | -2.40 | -3.07 | -3.94 | -4.03 | -3.98 | -3.19 | -3.61 |
| 610 | -4.45 | -3.32 | -3.20 | -3.64 | -4.50 | -5.15 | -5.23 | -5.00 | -4.47 | -4.75 |
| 578 | -5.93 | -5.06 | -4.96 | -5.58 | -6.16 | -6.78 | -6.54 | -6.52 | -5.95 | -6.31 |
| 546 | -8.12 | -7.05 | -6.79 | -7.31 | -8.19 | -8.76 | -8.38 | -8.20 | -7.71 | -8.25 |
| 514 | -10.59 | -9.68 | -9.18 | -9.83 | -10.58 | -11.23 | -10.56 | -10.32 | -10.11 | -10.44 |
| 450 | -16.51 | -15.60 | -15.45 | -16.00 | -16.33 | -16.74 | -16.16 | -15.78 | -15.49 | -16.06 |
| 386 | -24.14 | -23.40 | -22.84 | -23.53 | -24.07 | -24.53 | -23.76 | -23.04 | -22.87 | -23.44 |
| 322 | -33.56 | -32.97 | -32.56 | -33.11 | -33.54 | -33.70 | -33.08 | -32.43 | -32.12 | -32.70 | unit : (dBm)

FIG. 1(b)

| Gd\CH | 50 | 361 | 672 |
|---|---|---|---|
| 994 | 22.62 | 21.43 | 21.80 |
| 833 | 0.79 | 0.04 | -0.10 |
| 514 | -10.33 | -10.70 | -10.00 | unit : (dBm)

TRANSMISSION POWER CALIBRATING METHOD AND SYSTEM APPLIED TO WIRELESS APPARATUS

This application claims the benefit of Taiwan application Serial No. 99145078, filed Dec. 21, 2010, the subject matter of which is incorporated herein by reference.

BACKGROUND OF THE INVENTION

1. Field of the Invention

The invention relates in general to a wireless apparatus, and more particularly to a transmission power calibrating method and a system thereof for use in a wireless apparatus.

2. Description of the Related Art

Nowadays, the wireless apparatuses, such as 3G network interfaces (cards) or portable mobile phones, usually have a transmitter and a receiver, wherein, the transmitter is designated by Tx, the receiver is designated by Rx. The transmitter is an output device for outputting data packages to a data reception device outside the wireless apparatus. On the other hand, the receiver is an input device for receiving the data package outputted from a data emission device outside the wireless apparatus.

Take the wireless apparatus with 3G network card as an example. During the production process of the wireless apparatus, the radio frequency (RF) function of the wireless apparatus is required to be tested or verified, and a most important process relates to transmission power calibration. After transmission power calibration is completed, the transmission power generated by the transmitter of the wireless apparatus can comply with the regulations of the product specification or legal provisions, and be provided to the market.

In view of this, what is desired is to provide a method and system for transmission power calibration with high efficient, and to reduce the time and cost required for the transmission power calibration of the wireless apparatus.

SUMMARY OF THE INVENTION

The invention relates to a transmission power calibrating method for use in a wireless apparatus. The method includes the following steps: A plurality of channels and a plurality of amplification powers of a to-be-tested wireless apparatus are controlled through a computer host, and a simplified transmission power calibration table is established according to a plurality of transmission power values measured from the to-be-tested wireless apparatus. The simplified transmission power calibration table is compared with each one of a plurality of complete transmission power calibration tables of a database. A match is detected between the database contains a first complete transmission power calibration table matching the simplified transmission power calibration table successfully. When the match is detected, a mapping table is obtained by processing the first complete transmission power calibration table and stored in a memory of the to-be-tested wireless apparatus. When the match is not detected, the to-be-tested the computer host controls wireless apparatus to establish a second complete transmission power calibration table, to obtain mapping table is obtained by processing the from the second complete transmission power calibration table, and to store the mapping table in the memory of the to-be-tested wireless apparatus.

The invention relates to a transmission power calibration system for use in a wireless apparatus. The transmission power calibration system includes: a to-be-tested wireless apparatus; a computer host connected to the to-be-tested wireless apparatus, the computer host controlling a plurality of channels and a plurality of gains for testing a to-be-tested wireless apparatus; a power supply for powering the to-be-tested wireless apparatus under control of the computer host; a power measuring unit connected to the to-be-tested wireless apparatus, the power measuring unit measuring transmission power from the to-be-tested wireless apparatus, and providing a plurality of measured transmission power values to the computer host so that the computer host establishes a simplified transmission power calibration table, wherein the computer host compares the simplified transmission power calibration table with each one of a plurality of complete transmission power calibration tables in a database, the computer host obtains, when a match is detected between a first complete transmission power calibration table in the database and the simplified transmission power calibration table, a mapping table by processing the first complete transmission power calibration table, the computer host stores the mapping table in a memory of the to-be-tested wireless apparatus, and the computer host controls, when the match is not detected, the to-be-tested wireless apparatus to establish a second complete transmission power calibration table, to obtain the mapping table, and to store the mapping table in the memory of the to-be-tested wireless apparatus.

The above and other aspects of the invention will become better understood with regard to the following detailed description of the preferred but non-limiting embodiment(s). The following description is made with reference to the accompanying drawings.

BRIEF DESCRIPTION OF THE DRAWINGS

FIG. 1(b) shows a test table established during a generally known process of transmission power calibration;

DETAILED DESCRIPTION OF THE INVENTION

Figure 1A:
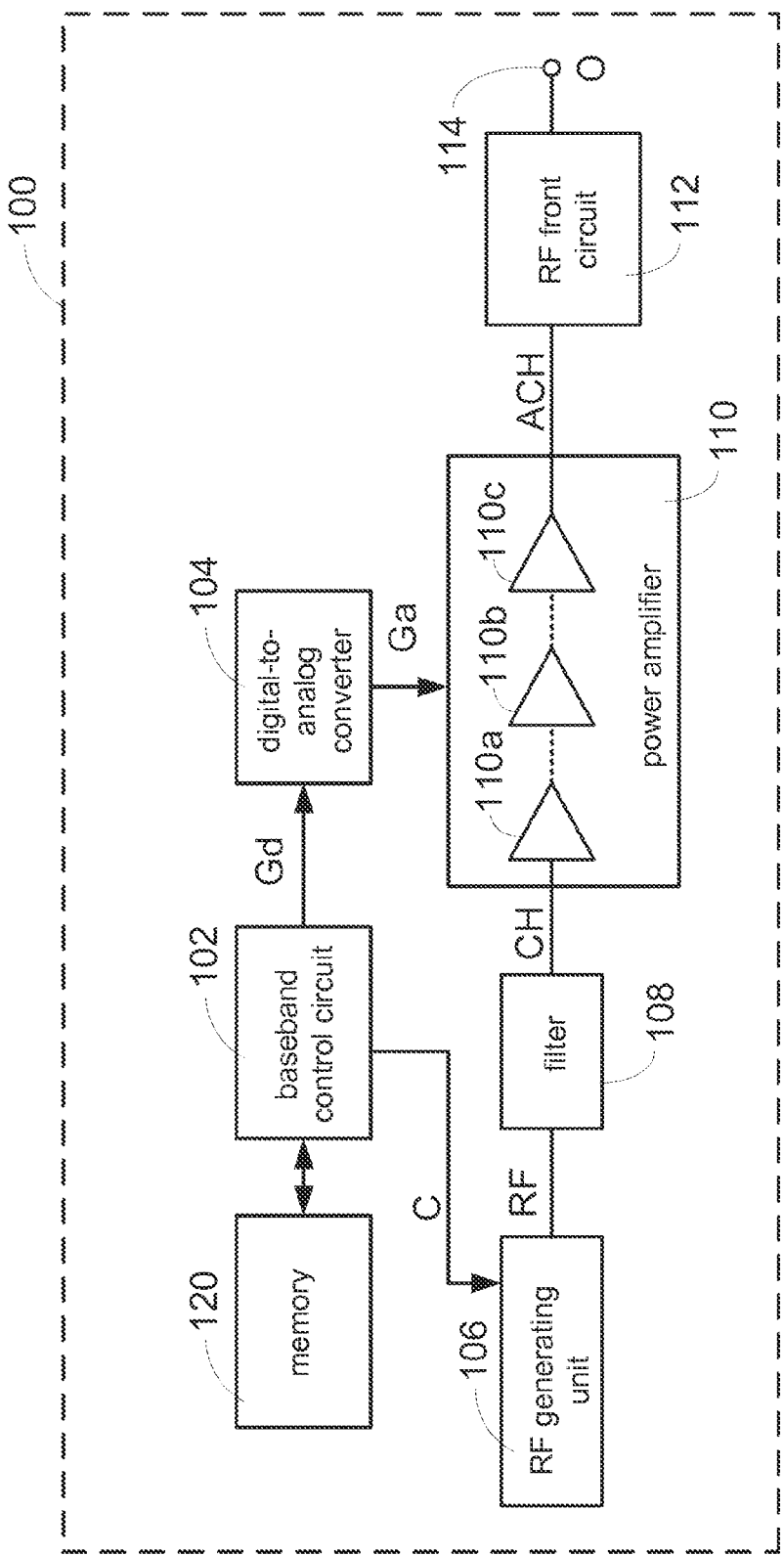
FIG. 1(a) shows a circuit block diagram of a wireless apparatus.

Referring to FIG. 1(a), a circuit block diagram of a wireless apparatus is shown. In the wireless apparatus 100, a baseband control circuit 102 generates a control signal C which enables a radio frequency (RF) generating unit 106 to generate a radio frequency signal RF, and a filter 108 is used together to generate a channel signal CH for various channels. The baseband control circuit 102 can generate a digital voltage gain Gd. A digital-to-analog converter 104 converts a digital voltage gain Gd into an analog voltage gain control signal Ga and inputs the analog voltage gain control signal Ga to a power amplifier 110. The power amplifier 110, after receiving the channel signal CH, adjusts its gain according to the analog voltage gain control signal Ga, and generates an amplified channel signal ACH accordingly. An RF front circuit 112 receives the amplified channel signal ACH and then generates an output signal O at an antenna port 114. The transmission power is the signal power of the output signal O at the antenna port 114.

The power amplifier 110 includes multi-stage power amplifying units 110a, 110b and 110c. According to the analog voltage gain control signal Ga, the power amplifier 110 controls the connection relationship among the power amplifying units 110a, 110b and 110c for gain adjustment, and generates the amplified channel signal ACH. The RF front circuit 112 can be realized by a combination of various passive elements such as resistors, inductors, or capacitors.

In general, the wireless apparatus 100 can be operated in at least a frequency band, and each frequency band includes a plurality of channels. For example, when the frequency band of the wireless apparatus 100 is between 1850 MHz~1910 MHz, the frequency band width is 60 MHz. Since each channel width is 50 KHz, the frequency band includes 1200 channels. The bandwidth and channel width of the frequency band can be adjusted with respect to different product specification or legal provisions.

As disclosed above, the process of transmission power calibration is expected to establish a mapping table stored in a memory 120 (e.g. a flash memory) of the wireless apparatus 100, so that the wireless apparatus 100, after leaving the factory, can precisely control its transmission power in various channels. In other words, after the process of transmission power calibration is completed, the wireless apparatus 100 can base each channel on generating transmission power that is complied with regulations.

During the process of transmission power calibration, a complete transmission power calibration table is established first according to the impedance characteristic of the wireless apparatus. As such, a plurality of channel numbers are sequentially selected from a frequency band, and the digital voltage gain Gd is controlled, such that the gain of the power amplifier 110 can be changed, and the transmission power outputted from the antenna port 114 can be recorded.

In other words, during the process of transmission power calibration, ten or more channel numbers and a plurality of gain values of the power amplifier are selected first, and then a power meter or a spectrum signal analyzer is used for measuring the corresponding transmission power so as to establish a complete transmission power calibration table.

Referring to FIG. 1(b), a test table established during a generally known process of transmission power calibration is shown. Firstly, a $50^{th}$ channel is selected by the baseband control circuit 102. Next, the gain of the power amplifier 110 is gradually or progressively increased so as to obtain the relationship between the gains and the transmission power values of the power amplifier 110 for the $50^{th}$ channel. Then, a $128^{th}$ channel, a $206^{th}$ channel, or other channels are sequentially selected, and the gain of the power amplifier 110 is progressively increased so as to obtain the relationship between the gains and the transmission power values of the power amplifier 110 for channels. For example, the larger the digital voltage gain Gd, the larger the gain of the power amplifier, and the higher the transmission power. Take the $50^{th}$ channel as an example. The transmission power is −33.56 dBm when the digital voltage gain Gd is 322. The transmission power is −24.14 dBm when the digital voltage gain Gd is 386. Analogically, other transmission power can be obtained in a similar manner, which is not repeated for the sake of brevity.

As indicated in FIG. 1(b), during the process of transmission power calibration, 10 channels are selected, and each channel respectively is provided with 22 gains of the power amplifier. Thus, the power meter may be required to perform 10×22=220 times of measuring as to establishing a complete transmission power calibration table.

After the complete transmission power calibration table is established, a mapping table can be obtained by performing an operation of interpolation, and the mapping table is stored in the memory 120. In this way, the wireless apparatus 100 can base each channel on generating transmission power that is complied with regulations.

For example, as to the $50^{th}$ channel, a transmission power of 0 dBm can be derived through the operation of interpolation when the digital voltage gain Gd is 774, and a transmission power of 1 dBm can be derived through the operation of interpolation when the digital voltage gain Gd is 840. Likewise, as to other channels, their corresponding values can also be derived through similar calculation. In this way, a mapping table can be established and stored in the memory 120.

Due to error or tolerance existing in each element of the wireless apparatus 100, its impedance characteristic is diverse. Thus, every wireless apparatus, before leaving the factory, may require transmission power calibration which assures that every wireless apparatus can comply with the regulations of legal provisions.

As regards the process of transmission power calibration, which is performed on a wireless apparatus for obtaining its complete transmission power calibration table before it leaves the factory, the process, however, is time consuming. In view of this, there are provided exemplary embodiments in this invention where one or more complete transmission power calibration tables, completed during a prior or previous process of transmission power calibration, can be collected and established in a database. Thus, during a later or subsequent process of transmission power calibration, a simplified transmission power calibration table can be obtained, and then the transmission power calibration can be completed according to the complete transmission power calibration table in the database.

Figure 2A:
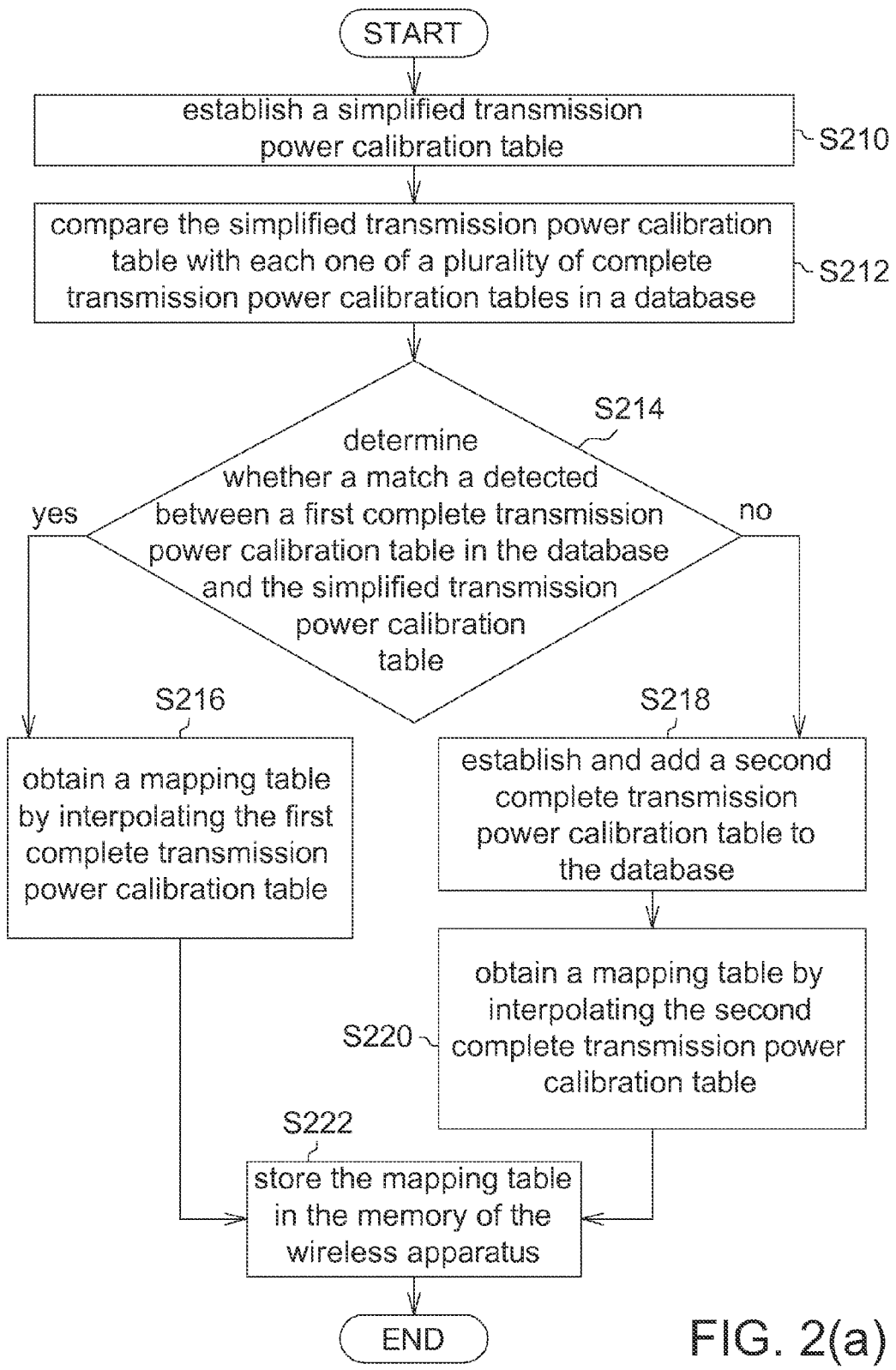
FIG. 2(a) shows a flowchart of a transmission power calibrating method of a wireless apparatus of the invention.

Referring to FIG. 2(a), a flowchart of a transmission power calibrating method of a wireless apparatus of the invention is shown. According to an embodiment of the invention, all complete transmission power calibration tables established through transmission power calibration are stored in the database of the computer system for use in subsequent comparison.

When other to-be-tested wireless apparatus require transmission power calibration, a simplified transmission power calibration table can be established first (step S210). Then, the simplified transmission power calibration table is compared with each one of a plurality of complete transmission power calibration tables in the database (step S212).

It is determining whether a match is detected between a first complete transmission power calibration table in the database and the simplified transmission power calibration table (step S214). When the match is detected, it indicates that the impedance characteristic of the to-be-tested wireless apparatus is similar to, or the same as, that of a tested wireless apparatus of the first complete transmission power calibration table. As such, a mapping table can be obtained by processing such as interpolating the first complete transmission power calibration table (step S216), and the mapping table can be stored in the memory of the wireless apparatus (step S222), thus completing the test for the transmitter of the wireless apparatus.

On the other hand, when the match can not be detected or identified between the first complete transmission power calibration table and the simplified transmission power calibration table (step S214), a second complete transmission power calibration table of the to-be-tested wireless apparatus can be established and, after being completed, added to the database (step S218). Then, a mapping table can be obtained by processing such as interpolating the second complete transmission power calibration table (step S220), and the mapping table is stored in the memory of the wireless apparatus (step S222), thus completing the test for the transmitter of the wireless apparatus.

Figure 2B:
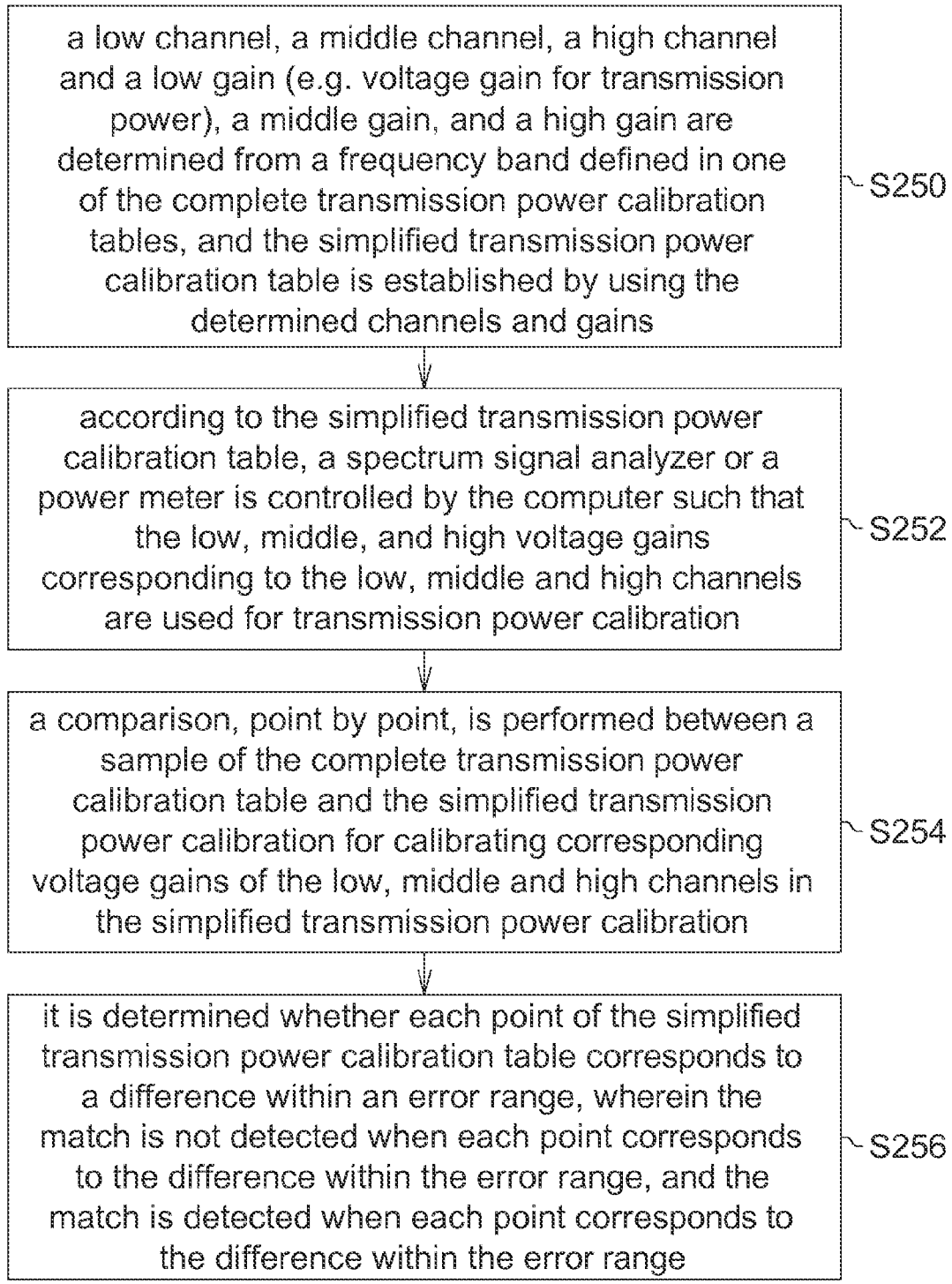
FIG. 2(b) shows a detailed flowchart of a transmission power calibrating method.

Referring to FIG. 2(b), a detailed flowchart of steps S210~S214 of a transmission power calibrating method is shown. Firstly, a low channel, a middle channel, a high channel and a low gain (e.g. voltage gain for transmission power), a middle gain, and a high gain are determined from a frequency band defined in one of the complete transmission power calibration tables, and the simplified transmission power calibration table is established by using the determined channels and gains (step S250). Next, according to the simplified transmission power calibration table, a spectrum signal analyzer or a power meter is controlled by the computer such that the low, middle, and high voltage gains corresponding to the low, middle and high channels are used for transmission power calibration (step S252). Then, a comparison, point by point, is performed between a sample of the complete transmission power calibration table and the simplified transmission power calibration for calibrating corresponding voltage gains of the low, middle and high channels in the simplified transmission power calibration (step S254). Next, it is determined whether each point of the simplified transmission power calibration table corresponds to a difference within an error range, wherein the match is not detected when each point corresponds to the difference within the error range, and the match is detected when each point corresponds to the difference within the error range (step S256). Detail illustration is provided as follows.

Figures 3, 4:
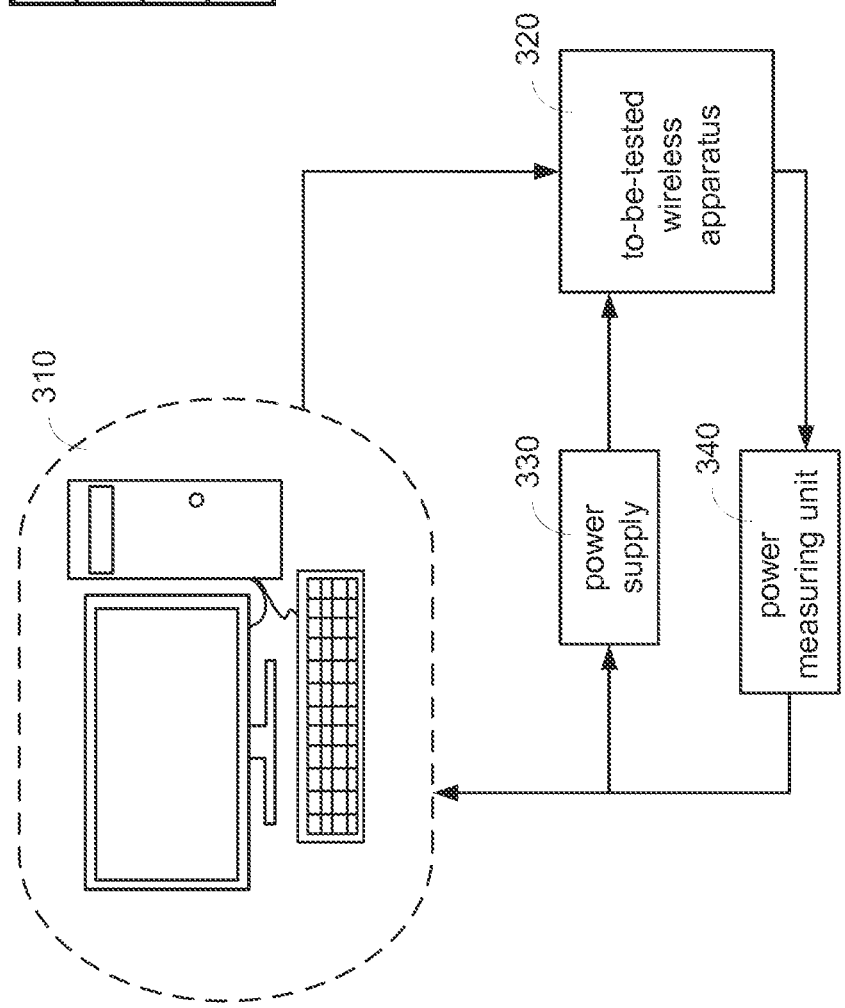
FIG. 3 shows a transmission power calibration system of a wireless apparatus of the invention.
FIG. 4 shows an embodiment of a simplified transmission power calibration table.

Referring to FIG. 3, a transmission power calibration system of a wireless apparatus of the invention is shown. A computer host 310 has a database for storing the complete transmission power calibration tables which are generated during previous transmission power calibration. The database can also be saved in a remote end server via the Internet.

Also, a power supply 330 and a power measuring unit 340 are controlled by the computer host 310. The power supply 330 powers or supplies power to the to-be-tested wireless apparatus 320. The power measuring unit 340 is for measuring the transmission power generated by the to-be-tested wireless apparatus 320, and transmitting the measured power values to the computer host 310.

When the to-be-tested wireless apparatus 320 performs transmission power calibration, the computer host 310 controls the to-be-tested wireless apparatus 320 to generate corresponding transmission power according to a plurality of channels and a plurality of gains, and establishes a simplified transmission power calibration table accordingly. According to an embodiment of the invention, in the simplified transmission power calibration table, its channels and digital voltage gains are selected from a complete transmission power calibration table. The number of determined channels and the number of digital voltage gains are smaller or less, as compared with that in the complete transmission power calibration table.

Referring to FIG. 4, a simplified transmission power calibration table embodiment is shown. In this example, the simplified transmission power calibration table has 3 channels (the $50^{th}$ channel, the $361^{st}$ channel, the $672^{nd}$ channel) and 3 digital voltage gains (994, 833, 514) both selected from the complete transmission power calibration table. However, the numbers of channels and voltages gains can be adjusted to fit actual needs and are not limited to 3.

Take the complete transmission power calibration table of FIG. 1(b) as an example. The complete transmission power calibration table includes 10 channel signals and 22 gains, which forms 10×22 kinds of transmission power. The simplified transmission power calibration table of FIG. 4 includes 3 channel signals and 3 gains, which forms 3×3 kinds of transmission power. In the simplified transmission power calibration table, its 3 channels are selected from the 10 channels of the complete transmission power calibration table, and its 3 gains are selected from the 10 gains of the complete transmission power calibration table.

It is assumed that the complete transmission power calibration table of FIG. 1(b) has been stored in the database, and the simplified transmission power calibration table established for the to-be-tested wireless apparatus is illustrated in FIG. 4. When the digital voltage gain is 994, the measured transmission power values at the 3 channels of FIG. 4 are 22.62 dBm, 21.43 dBm, 21.80 dBm, respectively. In FIG. 1(b), when the digital voltage gain is 994, the measured transmission power values at the 3 channels are 22.18 dBm, 21.74 dBm, 21.50 dBm, respectively. It can be seen that when the voltage gain is 994, each measured transmission power value of the channels corresponds to a difference which is within 0.5 dBm (first error range). Besides, when the voltage gain is 833, each measured transmission power value of the channels corresponds to a difference which is within 0.05 dBm (second error range). When the voltage gain is 514, each measured transmission power value of the channels corresponds to a difference which is within 0.3 dBm (third error range). This indicates that the database contains a first complete transmission power calibration table matching the simplified transmission power calibration table successfully, and a match is detected. That is, the impedance characteristic of the to-be-tested wireless apparatus 320 can be acknowledged from the complete transmission power calibration table of FIG. 1(b). Thus, after an operation of interpolation is performed on the complete transmission power calibration table of FIG. 1(b), a mapping table can be obtained, and the mapping table can be stored in the to-be-tested wireless apparatus 320 so as to complete transmission power calibration.

On the other hand, when a match is not detected between the simplified transmission power calibration table established for the to-be-tested wireless apparatus 320 and the complete transmission power calibration table of the database, a complete transmission power calibration table (a second complete test table) is required to be established as in the prior art. Then, the second complete transmission power calibration table is processed by performing an operation of interpolation thereon, and a mapping table can be obtained and stored in to-be-tested wireless apparatus 320, which completes transmission power calibration. The second complete test table can also be added to the database for increasing the samples of the complete transmission power calibration table.

According to an embodiment of the invention, the channels can be selected as one low channel, one middle channel, and one high channel, and the digital voltage gains can be selected as one low gain, one middle gain and one high gain. Thus, the simplified transmission power calibration table can be established with 9 times of measuring. Therefore, the invention consumes much less time. Besides, when there are more samples of the complete transmission power calibration table, the invention can save much more time in transmission power calibration, and the efficiency in testing is greatly increased.

To summarize, the transmission power calibrating method applied to a wireless apparatus of the invention locates the first complete transmission power calibration table from many complete transmission power calibration tables through comparison to obtain the mapping table directly and further store the mapping table in the memory of to-be-tested wireless apparatus. Thus, the required time for performing transmission power calibration is largely reduced for the wireless apparatus.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A transmission power calibrating method for use in a to-be-tested wireless apparatus, the method comprising the steps of:
controlling, at a computer host, the to-be-tested wireless apparatus to be tested at a plurality of channels and a plurality of gains, and establishing a simplified transmission power calibration table according to a plurality of transmission power values measured by a power meter from the to-be-tested wireless apparatus;
comparing the simplified transmission power calibration table with each one of a plurality of complete transmission power calibration tables in a database;
detecting a match between a first complete transmission power calibration table in the database and the simplified transmission power calibration table;
obtaining, when the match is detected, a mapping table by processing the first complete transmission power calibration table and storing the mapping table in a memory of the to-be-tested wireless apparatus; and
controlling, when the match is not detected, the to-be-tested wireless apparatus by the computer host to establish a second complete transmission power calibration table, to obtain the mapping table by processing the second complete transmission power calibration table, and to store the mapping table in the memory of the to-be-tested wireless apparatus,
wherein, in the step of controlling and establishing, the channels and the gains for testing are determined from a frequency band defined in one of the complete transmission power calibration tables, and the simplified transmission power calibration table is established by using the determined channels and gains;
wherein, in the step of detecting, it is determined whether each measured transmission power value of the simplified transmission power calibration table corresponds to a difference within an error range, and the match is detected when each measured transmission power value corresponds to the difference within the error range.

2. The transmission power calibrating method according to claim 1, wherein the first complete transmission power calibration table comprises M channels and P gains for M×P kinds of transmission power, and the simplified transmission power calibration table comprises m channels and p gains for m×p kinds of transmission power, where M is larger than m, P is larger than p, the m channels are selected from the M channels, and the p gains are selected from the P gains.

3. The transmission power calibrating method according to claim 2, wherein, in the step of controlling and establishing, the channels and the gains for testing are a low channel, a middle channel, a high channel and a low gain, a middle gain, and a high gain which are determined from the frequency band defined in one of the complete transmission power calibration tables, and the simplified transmission power calibration table is established by using the determined channels and gains.

4. The transmission power calibrating method according to claim 1, wherein the first complete transmission power calibration table and the simplified transmission power calibration table are corresponding to wireless transmission apparatuses being similar in impedance characteristic.

5. The transmission power calibrating method according to claim 1, wherein the mapping table is obtained by interpolating the first complete transmission power calibration table or the second complete transmission power calibration table.

6. The transmission power calibrating method according to claim 1, further comprising:
storing the second complete transmission power calibration table in the database.

7. A transmission power calibration system for use in a wireless apparatus, comprising:
a to-be-tested wireless apparatus;
a computer host connected to the to-be-tested wireless apparatus, the computer host controlling the to-be-tested wireless apparatus to be tested at a plurality of channels and a plurality of gains;
a power supply for powering the to-be-tested wireless apparatus under control of the computer host;
a power measuring unit connected to the to-be-tested wireless apparatus, the power measuring unit measuring transmission power from the to-be-tested wireless apparatus, and providing a plurality of measured transmission power values to the computer host so that the computer host establishes a simplified transmission power calibration table,
wherein the computer host compares the simplified transmission power calibration table with each one of a plurality of complete transmission power calibration tables in a database, the computer host obtains, when a match is detected between a first complete transmission power calibration table in the database and the simplified transmission power calibration table, a mapping table by processing the first complete transmission power calibration table, the computer host stores the mapping table in a memory of the to-be-tested wireless apparatus, and the computer host controls, when the match is not detected, the to-be-tested wireless apparatus to establish a second complete transmission power calibration table, to obtain the mapping table, and to store the mapping table in the memory of the to-be-tested wireless apparatus;
wherein the channels and the gains for testing are determined from a frequency band defined in one of the complete transmission power calibration tables, and the simplified transmission power calibration table is established by using the determined channels and gains; and
the computer host determined whether each measured transmission power value of the simplified transmission power calibration table corresponds to a difference within an error range, and the match is detected when each measured transmission power value corresponds to the difference within the error range.

8. The transmission power calibration system according to claim 7, wherein the to-be-tested wireless apparatus comprises:
a baseband control circuit for generating a control signal and a digital voltage gain under control of the computer host;
the memory connected to the baseband control circuit;
a radio frequency (RF) generating unit for receiving the control signal and generating a radio frequency signal;
a filter for receiving the radio frequency signal and outputting a channel signal;

a digital-to-analog converter for receiving the digital voltage gain and converting the digital voltage gain into an analog voltage gain control signal;

a power amplifier connected to the filter, the power amplifier having a plurality of gains, the power amplifier receiving the analog voltage gain control signal and providing one of the gains, the power amplifier generating an amplified channel signal; and a match circuit connected between the power amplifier and an antenna port for converting the amplified channel signal into an output signal at the antenna port.

9. The transmission power calibration system according to claim 7, wherein the first complete transmission power calibration table comprises M channels and P gains for M×P kinds of transmission power, the simplified transmission power calibration table comprises m channels and p gains for m×p kinds of transmission power, M is larger than m, P is larger than p, the m channels are selected from the M channels, and the p gains are selected from the P gains.

10. The transmission power calibration system according to claim 9, wherein, the channels and the gains for testing are a low channel, a middle channel, a high channel and a low gain, a middle gain, and a high gain which are determined from a band defined in one of the complete transmission power calibration tables, and the simplified transmission power calibration table is established by using the determined channels and gains.

11. The transmission power calibration system according to claim 7, wherein the first complete transmission power calibration table and the simplified transmission power calibration table are corresponding to wireless transmission apparatuses being similar in impedance characteristic.

12. The transmission power calibration system according to claim 7, wherein the computer host obtains the mapping table by interpolating the first complete transmission power calibration table or the second complete transmission power calibration table.

13. The transmission power calibration system according to claim 7, wherein the computer host further stores the second complete transmission power calibration table in the database.

* * * * *